May 22, 1956
F. F. HANSEN
2,746,403
BREAD MOULDING
Filed May 14, 1952
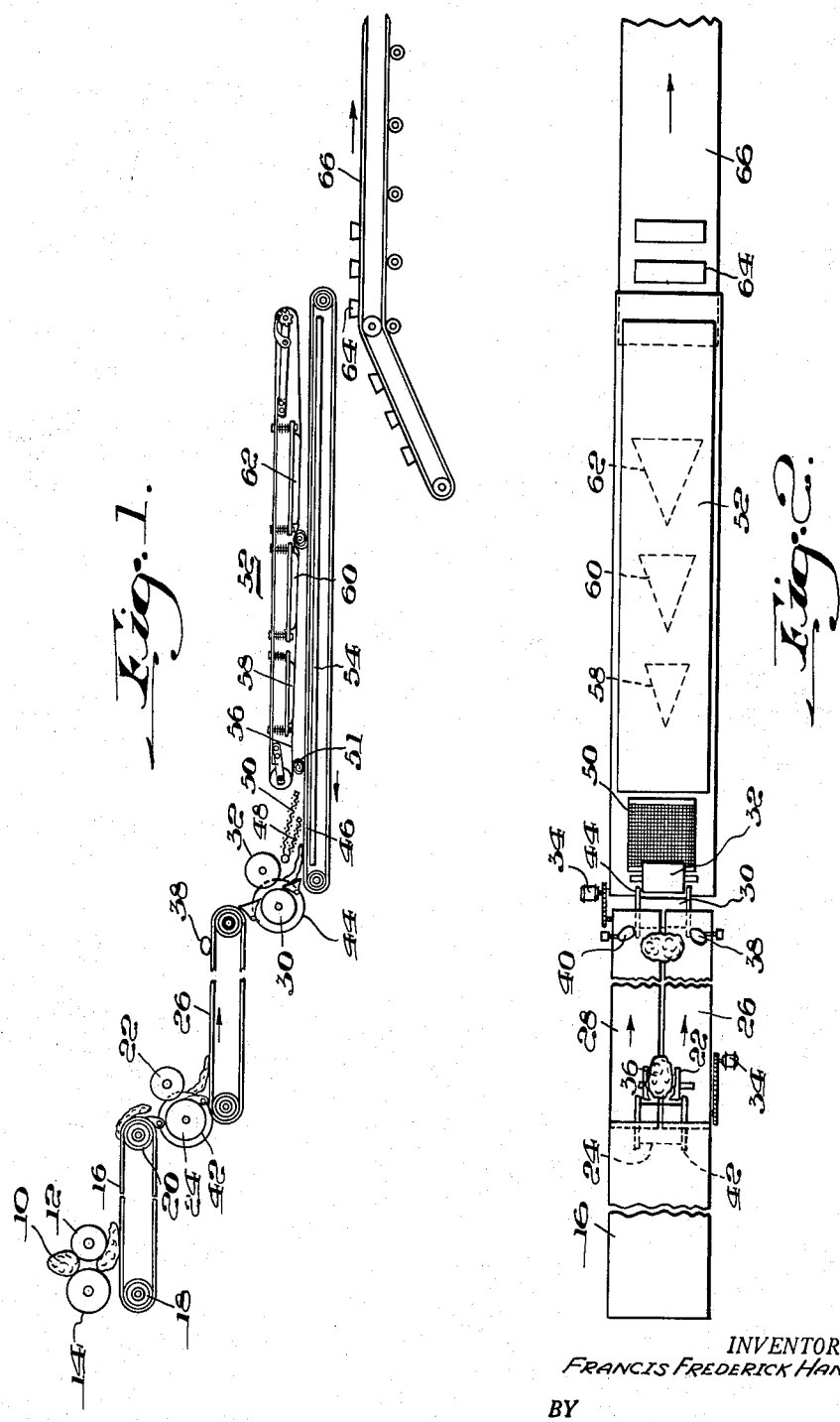
INVENTOR.
FRANCIS FREDERICK HANSEN.
BY
Christy, Parmelee and Strickland
his ATTORNEYS.

United States Patent Office 2,746,403
Patented May 22, 1956

2,746,403
BREAD MOULDING

Francis Frederick Hansen, Pittsburgh, Pa.

Application May 14, 1952, Serial No. 287,757

3 Claims. (Cl. 107—54)

This invention relates to bread moulding. More particularly the invention relates to the sheeting, curling, pressure rolling, and panning of yeast-rising bread dough to obtain bread of improved texture and grain structure, and to produce a baked loaf of uniform, pleasing appearance.

The present invention is a continuation-in-part of my invention defined in application Serial No. 263,572, filed December 27, 1951, for Cross and Diagonal Sheeting of Dough.

In accordance with application Serial No. 263,572 a lump of dough is passed through pre-sheeting rolls, then passed through a first set of sheeting rolls to be formed into a long, thin strip of dough. In this sheeting operation a compression kneading and extrusion action is effected by the rolls to arrange the dough into long protein strands which extend substantially parallel to the longitudinal axis of the strip. The strip of sheeted dough is delivered to a transfer belt upon which the strip is shifted to arrange its longitudinal axis at an angle of 45 to 90° to the longitudinal axis of the strip as it emerges from the first set of sheeting rolls. The shifted dough strip is then introduced into a second set of sheeting rolls to pass through the rolls to receive a second sheeting, shearing, compression and extrusion action, the sheeting being diagonal or at a right angle across the parallel strands of dough as originally sheeted to arrange the protein structure into a lattice-like cross weave to make the texture of dough quite uniform both longitudinally and transversely of the strip.

Heretofore, sheeted dough strips have been curled and pressure-rolled both longitudinally and transversely in making bread loaves. Much difficulty has been experienced in these curling and rolling operations to avoid whorls and holes in the bread loaves, and to have the baked bread uniform in color and in cross-sectional area. I have discovered that if a dough is diagonally, and particularly if cross-sheeted, it may be curled either longitudinally or transversely of the strip and produce bread loaves of excellent grain structure and fine texture. I have also discovered that if the dough sheeting operation is carried out in two steps with the last sheeting operation being a cross-sheeting at an angle of approximately 90° to the first sheeting action, the dough may be sheeted to produce a sheet which approaches a circular outline, and then the sheet may be curled in any direction and provide a bread loaf of fine grain and good texture. Further, with pressure-rolling, the texture will be uniform throughout the dough loaf, and the loaf will be free of whorls.

In my application Serial No. 280,891, filed April 7, 1952, for a Pressure Board, now Patent No. 2,677,334, dated May 4, 1954, I describe an apparatus by which a cross-sheeted strip of dough may be curled and rolled to produce a bread loaf which is free of occluded air and uniform in cross-section throughout its length. Reference is hereby made to application Serial No. 290,891 for a detailed illustration and description of this pressure-rolling apparatus.

The primary object of the present invention is to provide a method of and apparatus for moulding yeast-rising bread dough to make a baked loaf of bread which has a uniform grain and texture, and a uniform shape and color.

Another object of the invention is to provide a method and apparatus by which lumps of dough may be sheeted, curled, pressure-rolled and panned rapidly and continuously with the loaves spaced a short distance apart.

A further object of the invention is to provide a method and apparatus by which lumps of dough may be sheeted and shifted automatically to carry out cross-sheeting and curling with the dough moving in a unidirectional path.

With these and other objects in view, the invention consists in the method and apparatus for sheeting, curling and pressure-rolling dough loaves as hereinafter illustrated and described and particularly defined in the appended claims.

The various features of the invention are illustrated in the accompanying drawings, in which:

Fig. 1 is a diagrammatic view in side elevation of an apparatus for cross-sheeting, curling, pressure-rolling and panning bread dough loaves which embodies the preferred form of the invention; and Fig. 2 is a diagrammatic plan view of the apparatus shown in Fig. 1.

Referring to the apparatus shown in the drawings, lumps of bread dough 10 of uniform weight, which are preferably separated by a measuring machine from a large batch of dough, are first passed through pre-sheeting rolls 12 and 14 to flatten and lengthen the dough. The flattened dough strip is received upon a belt 16 which runs between pulleys 18 and 20 to be delivered to the first set of sheeting rolls 22 and 24. In the rolls 22 and 24 the dough is pressed into a comparatively thin elongated strip with the protein of the dough arranged in strands substantially parallel to the longitudinal axis of the strip. As the dough emerges from the rolls 22—24, it is received upon transfer belts 26 and 28 which carry the strip to a second set of sheeting rolls 30 and 32. The belts 26 and 28 are preferably arranged to have their upper run in a common plane, and each belt is separately driven by a motor 34. Preferably the belt 26 is moved at a slower rate of speed than the belt 28, each of the motors being controllable to vary the speed of the belts. By running the belt 28 at a higher rate of speed than the belt 26, the sheet of dough illustrated at 36 may be shifted on the belt through any desired angle. In the preferred operation the length of the belts and the speeds of the belts are such that the sheet 36 will be moved into a position illustrated, wherein the longitudinal axis of the strip will be arranged at an angle of 90° to the line of movement of the strip through the sheeting rolls 22 and 24. Guides 38 and 40 are adjustably mounted above the belts 26 and 28 respectively in a position to engage the edges of the strip 36 and accurately position it with reference to the sheeting rolls 30 and 32. The rolls 24 and 30 are provided with flanges 42 and 44 respectively, which are arranged to engage the sides of the strip to control the shape of the strip as it is compressed and extruded to form the sheet. By controlling the thickness of the sheet and in accordance with the spacing of the rolls and the distance apart of the flanges on the rolls, any desired width of sheet may be obtained. The relation of the width of the sheeting rolls can be made so that when the sheet emerges from the sheeting rolls 30—32, it will have a simulated circular contour for forming the loaf. Furthermore, the width of an elongated strip or the diameter of the circular strip will be slightly less than the length of the loaf of bread to be made from the dough, and the dough will be further lengthened in the rolling operation as hereinafter described.

As the dough emerges from the second sheeting rolls

30—32, it is received upon a pressing and curling belt 46 which carries it first under a pair of curling drags 48 and 50 to roll the dough into a roll 51. From the curlers the roll 51 is carried by the belt 46 under a pressure roller 52. The belt 46 moves across a support 54 and the roll 51 moves between the belt 46 and a belt 56 mounted on the pressure roller frame. The pressure roller consists of three triangular boards 58, 60 and 62 which are arranged to have the point of the triangular boards engage the center of the dough roll 51 and to exert pressure to elongate the dough as it passes under the boards from the center toward each end. By this operation occluded air which is trapped in the roll as the sheet is curled is driven out of the end of the dough roll and the dough is consolidated to make a substantially uniform body and to eliminate the division lines which are formed in rolling the sheeted strip.

After the dough is rolled, it passes over the end of the belt 46 and is received in pans 64 which are positioned under the belt 46 on a belt 66, the movement of the belt 66 being coordinated with the movement of the belt 46 so that a pan will be under the end of the belt 46 to receive the dough as it emerges from the pressure roller.

From the above description it will be seen that the lumps of dough to form the loaves move in a unidirectional path from the time they enter the moulder until the dough is placed in the pans and carried out of the moulder. The grain and dough texture is made fine and uniform by the cross-sheeting operations and the turning the sheet between the sheeting operations to obtain cross-sheeting arranges the dough sheet so that the texture is substantially uniform throughout the strip. Furthermore, by the cross-sheeting operation, the texture of the sheet is such that it does not matter which way the sheet is curled in forming the loaf, because of the uniform character of the dough after being cross-sheeted. The pressure-rolling operation furthermore eliminates air from the dough so that the baked loaf does not have holes therein and the texture of the dough roll is such that it will bake to give a uniform color. The rolling operation furthermore makes a substantially uniform cross section of the dough loaf from one end to the other, and thus provides a loaf of bread which, when baked, is uniform in appearance and fully fills the pan.

The texture of the sheeted dough may be improved during the sheeting operation by arranging so that a pair of rolls 22 and 24 and 30 and 32 will run at differents rates of speed so that one face of the sheet of dough receives a shearing action during the sheeting operation. This shearing action may be accomplished by having one roll smaller in diameter than the other, and running both rolls at the same rate of speed, or by having rolls of the same diameter and running the rolls at different rates of speed. This sheeting operation is illustrated and described in my application Serial No. 261,288, filed December 12, 1951, for Bread Baking. Reference is hereby made to said application for a detailed description of the shearing operation.

The preferred form of the invention having been thus described, what is claimed as new is:

1. A continuous method of moulding loaves of bread dough comprising advancing a lump of dough in a substantially unidirectional straight line path while presheeting the dough by compressing, kneading, and extruding it to arrange the protein strands of the dough parallel to the line of movement of the presheeted dough to form a flat elongated strip, bodily carrying the strip from the presheeting operation through a sheeting operation in said unidirectional path and turning the strip while supported in a flat position while in transit through an angle of approximately 90° to the line of advancement of the strip to form the protein strands into a lattice like cross weave structure then curling the sheeted strip while in its turned relation to the line of advancement to form a dough roll and pressure rolling the dough roll while it advances in said unidirectional line of movement.

2. The method of moulding loaves of bread dough as defined in claim 1 in which one surface of the dough is torn and ruptured as the dough is sheeted into the strip with a lattice like structure.

3. The method defined in claim 1 in which the two sheeting operations form a strip of generally circular contour as it emerges from the second sheeting rolls to be curled.

References Cited in the file of this patent

UNITED STATES PATENTS

| | | |
|---|---|---|
| 787,274 | Burns | Apr. 11, 1905 |
| 1,249,294 | Sonsthagen | Dec. 4, 1917 |
| 1,312,094 | Baker et al. | Aug. 5, 1919 |
| 1,763,620 | Wolfarth et al. | June 10, 1930 |
| 1,951,549 | Kirchhoff | Mar. 20, 1934 |
| 2,373,012 | Burdett et al. | Apr. 3, 1945 |
| 2,431,074 | Palmer | Nov. 18, 1947 |
| 2,479,864 | Rhodes | Aug. 23, 1949 |
| 2,534,734 | Rhodes | Dec. 19, 1950 |